US006572012B1

(12) United States Patent
Gannon et al.

(10) Patent No.: US 6,572,012 B1
(45) Date of Patent: Jun. 3, 2003

(54) TRANSACTION TERMINAL HAVING A PROTECTIVE COVER ASSEMBLY

(75) Inventors: Colleen P. Gannon, Jordan, NY (US); Gerard F. Beckhusen, Liverpool, NY (US); Donna M. Fletcher, Auburn, NY (US)

(73) Assignee: Welch Allyn Data Collection. Inc., Skaneateles Falls, NY (US)

( * ) Notice: Subject to any disclaimer, the term of this patent is extended or adjusted under 35 U.S.C. 154(b) by 170 days.

(21) Appl. No.: 09/750,479

(22) Filed: Dec. 28, 2000

(51) Int. Cl.[7] .............................................. G06F 17/60
(52) U.S. Cl. ........................ 235/379; 235/383; 235/380
(58) Field of Search ................................ 235/379, 380, 235/381, 383, 385, 472; 705/15; 713/186; 178/18.03

(56) References Cited

U.S. PATENT DOCUMENTS 4,791,278 A * 12/1988 Hudson et al. ................ 235/7
5,448,044 A * 9/1995 Price et al. ................. 235/380
5,539,159 A * 7/1996 Protheroe et al. ........ 178/18.05
5,561,282 A * 10/1996 Price et al. ................. 235/380
5,661,297 A * 8/1997 Aleshire et al. ............ 250/239
5,805,416 A * 9/1998 Friend et al. ............... 361/686
5,852,288 A * 12/1998 Nakazawa et al. .......... 235/472
5,892,824 A * 4/1999 Beatson et al. ............. 713/186
5,933,812 A * 8/1999 Meyer et al. ................. 705/15
5,936,220 A * 8/1999 Hoshino et al. ............ 235/380
6,139,152 A1 * 2/2001 Fernando et al. ........... 235/380

* cited by examiner

*Primary Examiner*—Karl D. Frech
*Assistant Examiner*—Ahshik Kim
(74) *Attorney, Agent, or Firm*—Wall Marjama & Bilinski LLP

(57) ABSTRACT

A point of sale transaction terminal having a flat wall surface containing a signature capture pad and further includes electrical lead lines that surround the capture pad and carry signature related data to an x-y register or the like. A lower cover panel is placed upon a wall that surrounds the capture pad so that the panel physically covers the lead lines. The lower cover panel is secured to the wall surface by a relatively strong bonding material which provides a tight seal between the panel and the wall surface which prevents water and dirt from passing beneath the panel. An upper cover panel having a protective window that is mounted within a frame is placed in registration over the lower cover panel so that the window is centered over the capture pad. The upper cover panel is releasably secured to the lower cover panel by an adhesive so that the upper panel can be easily removed from the assembly and replaced in the event the protective window is worn or damaged.

8 Claims, 1 Drawing Sheet

TRANSACTION TERMINAL HAVING A PROTECTIVE COVER ASSEMBLY

FIELD OF THE INVENTION

This invention relates generally to a transaction terminal, and specifically to a protective cover assembly for a transaction terminal having a signature capture pad.

BACKGROUND OF THE INVENTION

Transaction terminals are finding wider use at the point of sale in the retail store industry. Many of these terminals have card readers for rapidly acquiring credit card and customer related data. Typically, the card is simply drawn through a slot in the terminal and the related data applied to a microprocessor so that the customer can be identified and a sales slip generated. As part of the transaction terminal, a signature capture pad is also provided upon which the customer can write his or her name and the signature is electronically recorded.

The capture pad used in many transaction terminals typically includes a rectangular glass substrate that is separated from a deformable polyester cover sheet by relatively small non conductive spheres. The opposing surfaces of the substrate and cover sheet are coated with a conductive material and the coatings, in turn, are connected to lead lines that surround the outer periphery of the capture pad. The lead lines are connected to an x-y register which is arranged to record the signature data and forward this information on to the terminal processor. In practice, the customer places his or her signature on the capture pad using a plastic stylus, the point of which forces the conductive coating of the outer panel into contact with the conductive coating of the underlying substrate to trace the signature electronically. Many customers using the terminal ignore the plastic stylus and attempt to write directly upon the capture pad with a writing instrument such as a ball point pen. This rapidly degrades the capture pad and destroys the usability of the terminal. Writing directly upon the capture pad with a plastic stylus will also eventually wear down the relatively thin upper panel again rendering the pad no longer usable.

To prevent the capture pad from prematurely failing, replaceable screens have been devised which protect the pad from direct contact with the stylus as well as potentially harmful writing instruments. The screen is adapted to cover the capture pad and typically is mounted within a frame that surrounds the screen. An adhesive backing is placed upon the bottom surface of the frame that permits the panel to be removably attached to the terminal housing about the capture pad. These protective coverings, for the most part, work well under normal operating conditions. However, more and more terminals are being placed in areas where they are exposed to moisture and high levels of dust and dirt such as home improvement stores, garden centers, and the like. Oftentimes, a clerk will remove a protective panel from the terminal and fail to replace it for a long period of time during which dirt and moisture can find its way into the electronic components causing a good deal of damage. Removal of the protective cover also allows customers to write upon the capture pad with potentially harmful instruments. Many of these protective covers are difficult to align over the capture pad and do little to protect the electronic lead line from physical damage. In addition, the adhesive bonding the protective cover to the terminal generally forms a weak bond that is neither moisture proof or dirt proof and, as a result, contaminants can penetrate the cover and cause harm to the terminal components.

SUMMARY OF THE INVENTION

It is therefore a primary object of the present invention to improve transaction terminals.

It is a further object of the present invention to protect the signature capture pad of a transaction terminal and its related electronic components from harm.

A still further object of the present invention is to create a cover system to improve the protection afforded the signature capture pad of a transaction terminal.

Another object of the present invention is to provide a warning to the user of a transaction terminal when the protective cover for the terminal signature capture pad is removed from the terminal.

Yet another object of the present invention is to extend the usable life of a signature capture pad utilized in a transaction terminal.

These and other objects of the present invention are attained by a transaction terminal that includes a cover assembly for protecting the terminal's signature capture for electronically recording a customer's signature and the pad's associated electrical components from harm. The cover assembly includes a first lower cover panel that surrounds the capture pad and covers electrical lead lines that carry signature data to a register or memory located within the terminal housing. The first cover panel is bonded to the housing to create a moisture and dirt tight seal therebetween, as well as physically protecting the electrical lead lines. A second upper cover panel is placed over the lower cover panel which includes a frame and a protective window mounted inside the frame that overlies and is in close proximity with the underlying portion of the capture pad so that a signature written upon the window will be recorded upon the capture pad. The lower surface of the upper cover panel contains an adhesive that allows the top cover panel to be removably attached to the lower cover panel whereby the upper cover panel can be easily removed and replaced when the window becomes worn or damaged. A warning message is printed upon the top surface of the lower panel which is clearly discernable when the upper cover panel is removed, warning the user not to write upon the capture pad until the upper cover is replaced.

BRIEF DESCRIPTION OF THE DRAWING

For a better understanding of these and other objects of the present invention, reference will be made to the following detailed description of the invention which is to be read in connection with the accompanying drawings, wherein.

DETAILED DESCRIPTION OF THE INVENTION

Figure 1:
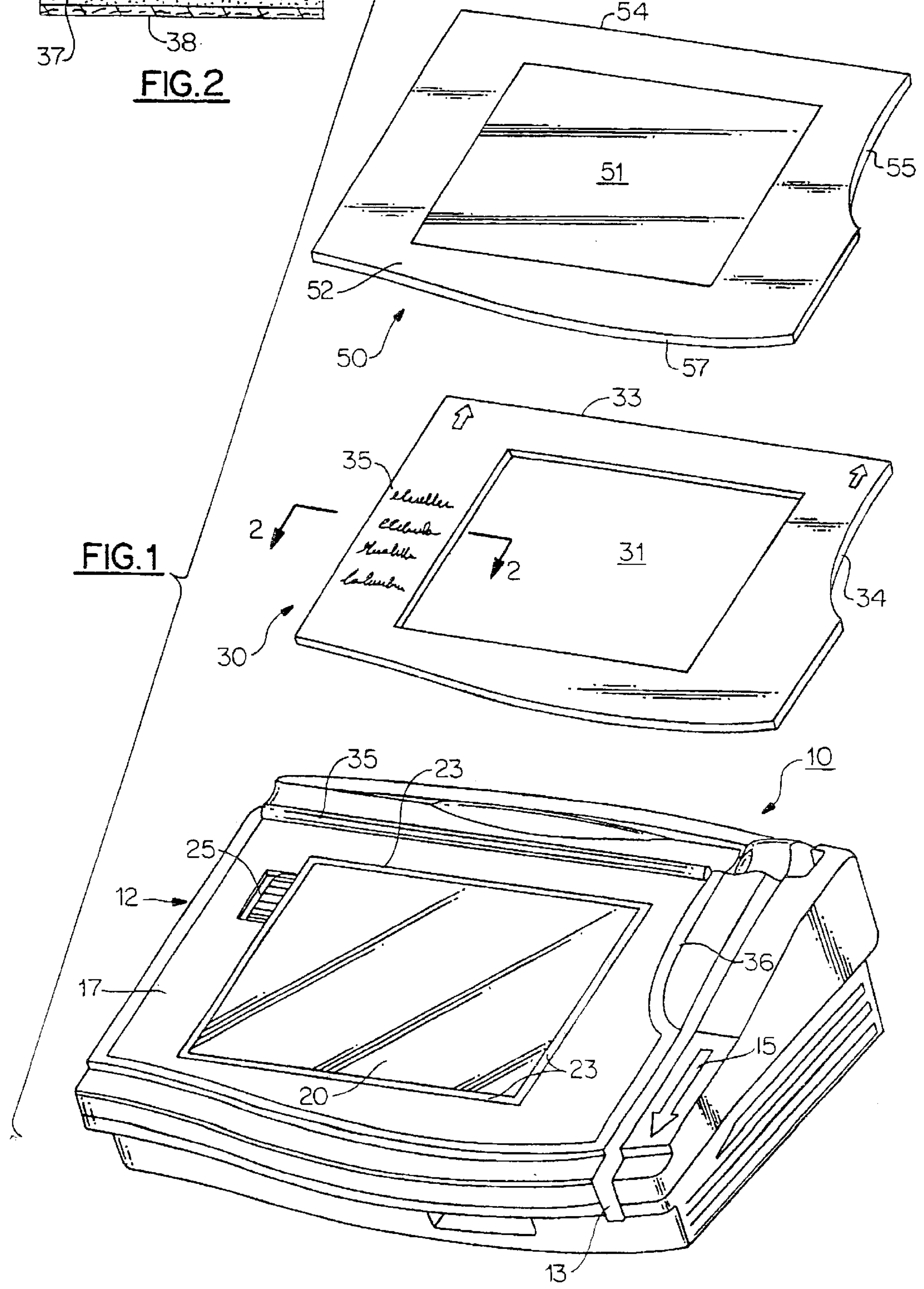
FIG. 1 is an exploded view in perspective illustrating a transaction terminal embodying the teachings of the present invention.

Turning initially to FIG. 1, there is illustrated a point of sale transaction terminal of well known design which is generally referenced 10. The terminal includes a housing 12 that contains electronic components for reading a credit card or the like, storing card and sales data, and causing a sales slip to be generated. A vertically aligned slot 13 is provided along one side of the housing into which the debit card or credit card is inserted and drawn in the direction of the arrow 15. A card reader is mounted adjacent the slot for reading and recording the required data from the card and forwarding the data on to a microprocessor for use in completing the sales transaction.

The housing also includes a flat writing platen 17 that forms part of the top surface of the housing. A signature capture pad 20 is recessed into the platen so that the top surface of the capture pad is coextensive with that of the platen thus providing a convenient platform upon which a customer may write his or her signature. As noted above, the capture pad is designed to electrically record the customer's signature and send the recorded data via suitable electrical lead lines 23 to an x-y register stored within the housing. The lines 23 extend around the outer periphery of the capture pad and pass into the housing through an opening 25. The lead lines that extend about the capture pad are at least partially exposed and thus subject to damage if the lines are penetrated physically as for example, by a writing stylus or the like. Exposing the lead lines, as well as the opening 25 in the housing, to moisture and dirt can result in the terminal's electrical components becoming damaged and rendered unusable.

As noted above, replaceable covers are known in the prior art for protecting the signature capture pad from undue wear and for preventing customers from writing directly upon the capture pad with pens or other similar type harmful writing instruments. These protective covers contain a writing screen that is generally rectangular in shape to complement the shape of the capture pad and are contained within a frame. The bottom surface of the frame may be coated with an adhesive that permits the frame to be lightly bonded to the terminal around the border of the capture pad so that the cover can be periodically peeled off and replaced when the screen becomes worn or damaged. For the most part, the adhesive does not provide a reliable water or dirt-tight seal. Accordingly, the terminal can be exposed to moisture and dirt related damage regardless of whether the protective cover is in place or removed from the terminal. Furthermore, many of the protective covers give little consideration to protecting the exposed electrical lead lines that surround the capture pad and these relatively sensitive lines remain exposed to physical harm when the protective cover is in place.

The present invention includes a two piece protective cover assembly as illustrated in FIG. 1 that includes a first lower cover panel 30 and a second upper cover panel 50. The lower cover panel 30 is arranged so that it can be placed upon the platen surface 17 in registration over the capture pad 20 of the housing.

The lower cover panel has a clear opening 31 therein through which a writing stylus is provided access to the capture pad. The top edge 33 and the side edge 34 of the panel are formed so that they can be aligned in registration against raised surfaces 35 and 36, respectively, on the platen thus allowing the lower cover panel to be accurately aligned upon the platen over the capture pad. When registered against the raised surfaces, the clear opening in the lower cover panel is centered over the capture pad. The size of the opening is slightly less than that of the pad so that the panel covers the electrical lines that extend about the periphery of the pad and thus physically shield the lines from harm.

Figure 2:
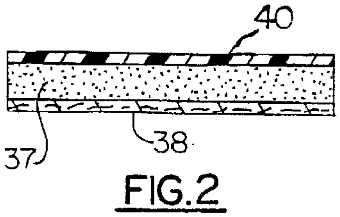
FIG. 2 is a section taken along lines 2—2 in FIG. 1.

Referring now to FIG. 2, the lower cover panel 30 contains a main body section or substrate 37 that is constructed of paper board or a polyester material. A coating 38 is applied to the bottom surface of the substrate which is formed of a suitable bonding material that will securely hold the panel to the platen. The bonding material is capable of forming a seal against the platen and the electrical lines that will prevent moisture and dirt from passing under the panel. The top surface of the substrate also is provided with a thin layer of material 40 that has a low surface energy, the purpose of which will be explained in greater detail below. Preferably, the top layer 40 is fabricated from a polypropylene that exhibits good release properties.

Finally, the lower cover panel is covered by an upper cover panel 50 that includes a resilient window 51 that is mounted inside of a frame 52. The shape of the frame complements that of the lower cover panel and again, contains a top edge 54 and a side edge 55 that can be aligned in registration against the raised surfaces 35 and 36 of the platen whereby the window 51 is centered over the capture pad. The bottom surface 57 of the upper cover panel is coated with an adhesive material for releasably securing the upper panel against the top surface 40 of the lower panel. The adhesive properties and the polypropylene top coating of the lower cover panel combine so that the upper cover panel can be peeled away easily from the lower panel in the event the protective window 51 becomes worn or damaged through usage. The removed upper cover can be easily replaced with a new protective panel by simply registering the new panel against the raised surfaces of the platen and placing the adhesive backing in contact against the top surface of the lower cover panel. Preferably, the protective window is fabricated of a polycarbonate which is transparent and has good wear resistant properties. In assembly, the protective window is placed in close proximity with the capture pad and has sufficient resiliency so that an image will be recorded on the capture pad when a signature is written upon the surface of the protective window.

Printed material 35 is provided on the top surface of the lower cover panel which will be covered when the upper cover panel is mounted over the lower panel. As can be seen, removal of the upper cover panel for any reason renders the printed matter immediately discernable to anyone using the terminal. Among other things, an easily readable warning is printed upon the border panel alerting the user to the fact the upper protective panel is missing and must be replaced before use to prevent the capture pad from being damaged. The warning may further alert the user not to write on the pad using any type of writing instrument except the stylus specifically provided for this purpose.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A point of sale transaction terminal that includes:

signature capture pad having electrical lead lines extending about the periphery of the pad, said capture pad being mounted in a surface of the terminal housing, a first lower cover panel mounted upon said housing surface that surrounds the capture pad and covers said electrical lead lines, a bonding material for securing the lower cover panel to said housing surface to provide a moisture and dirt tight seal between the lower cover panel and said housing surface, a second upper cover panel containing a protective window mounted inside a frame, said frame being releasably secured to the top surface of the lower cover panel by an adhesive so that the protective window overlies the capture pad, and said protective window being fabricated of a resilient material so that a signature or any other indicia that is written on the window will be recorded upon the capture pad.

2. The transaction terminal of claim 1 wherein said lower cover panel includes a top surface having a coating thereon which has a low surface energy so that the upper cover panel is easily released from said lower cover panel.

3. The transaction terminal of claim 2 wherein the top surface of said lower cover panel is fabricated of a polypropylene.

4. The transaction terminal of claim 3 wherein said lower cover panel is fabricated of a paper material and the bonding material is coated upon the bottom surface of the panel.

5. The transaction terminal of claim 1 wherein the lower cover panel contains printed material on its top surface that is covered by said frame of the upper cover panel in assembly.

6. The transaction terminal of claim 1 wherein said window is fabricated of a plastic material having high surface wear resistance.

7. The transaction terminal of claim 6 wherein said window is fabricated of a polycarbonate.

8. The transaction terminal of claim 5 wherein said printed material contains a warning that is clearly discernable to the user when the upper cover panel is removed from the border panel.

* * * * *